United States Patent
Shahraray et al.

(10) Patent No.: US 9,026,555 B2
(45) Date of Patent: May 5, 2015

(54) SYSTEM AND METHOD FOR ADAPTIVE PLAYBACK BASED ON DESTINATION

(75) Inventors: Behzad Shahraray, Holmdel, NJ (US); Andrea Basso, Marlboro, NJ (US); Lee Begeja, Gillette, NJ (US); David C. Gibbon, Lincroft, NJ (US); Zhu Liu, Marlboro, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/567,539

(22) Filed: Aug. 6, 2012

(65) Prior Publication Data
US 2012/0304043 A1   Nov. 29, 2012

Related U.S. Application Data

(63) Continuation of application No. 13/204,970, filed on Aug. 8, 2011, now Pat. No. 8,239,410, which is a continuation of application No. 12/177,582, filed on Jul. 22, 2008, now Pat. No. 7,996,422.

(51) Int. Cl.
*G06F 17/30* (2006.01)
*G11B 27/034* (2006.01)
*G11B 27/10* (2006.01)

(52) U.S. Cl.
CPC ............ *G11B 27/034* (2013.01); *G11B 27/105* (2013.01)

(58) Field of Classification Search
CPC .......... G06F 17/30837; G06F 17/3083; G06F 17/30846; G06F 2212/454; G06F 2212/464; G06Q 20/00; G06Q 20/12; G06Q 20/388; G06Q 20/4014; G06Q 20/382; G06Q 50/06; H04N 7/104; H04N 7/106; H04N 21/4104; H04N 21/4122; H04N 7/17318; H04N 21/6126; H04N 7/17354; H04N 21/6405; H04N 21/6408; H04N 21/2665; H04N 21/2221; G11B 27/034; G11B 27/105; H04L 65/4076; H04L 65/103
USPC .......... 707/804, 784, E17.009; 715/202, 719, 715/736, 727, 720, 716; 725/34, 60, 86, 32, 725/109, 105, 134, 120, 43, 78, 126, 37, 725/135, 87, 38, 89, 40, 133, 141, 153, 138, 725/140; 701/1, 33, 35, 36, 210; 455/456.1, 455/414.1; 709/228, 229, 231, 217, 213; 84/609; 386/343, 284, 291, 230, 239, 386/219, 220, 95
See application file for complete search history.

(56) References Cited

U.S. PATENT DOCUMENTS 5,333,176 A * 7/1994 Burke et al. .................. 455/557
6,055,619 A * 4/2000 North et al. ..................... 712/36
(Continued)

FOREIGN PATENT DOCUMENTS

EP   1 146 739   4/2001

OTHER PUBLICATIONS

Xinyan Zhang; Jiangchuan Liu; Bo Li; Yum, T.P.—"CoolStreaming/DONet: a data-driven overlay network for peer-to-peer live media streaming"—Published in: INFOCOM 2005. 24th Annual Joint Conference of the IEEE Computer and Communications Societies. Proceedings IEEE (vol. 3) Date of Conference: Mar. 13-17, 2005 pp. 2102-2111.*

(Continued)

*Primary Examiner* — Anh Ly

(57) ABSTRACT

Disclosed herein are systems, methods, and computer readable-media for adaptive media playback based on destination. The method for adaptive media playback comprises determining one or more destinations, collecting media content that is relevant to or describes the one or more destinations, assembling the media content into a program, and outputting the program. In various embodiments, media content may be advertising, consumer-generated, based on real-time events, based on a schedule, or assembled to fit within an estimated available time. Media content may be assembled using an adaptation engine that selects a plurality of media segments that fit in the estimated available time, orders the plurality of media segments, alters at least one of the plurality of media segments to fit the estimated available time, if necessary, and creates a playlist of selected media content containing the plurality of media segments.

14 Claims, 3 Drawing Sheets

(56) References Cited

U.S. PATENT DOCUMENTS

| | | | |
|---|---|---|---|
| 6,240,183 B1 | 5/2001 | Marchant | |
| 6,405,166 B1 | 6/2002 | Huang et al. | |
| 6,526,335 B1 * | 2/2003 | Treyz et al. | 701/1 |
| 6,587,404 B1 * | 7/2003 | Keller et al. | 369/30.06 |
| 6,711,474 B1 * | 3/2004 | Treyz et al. | 701/1 |
| 6,731,625 B1 * | 5/2004 | Eastep et al. | 370/352 |
| 6,868,292 B2 * | 3/2005 | Ficco et al. | 725/153 |
| 7,107,045 B1 | 9/2006 | Knoop | |
| 7,145,898 B1 * | 12/2006 | Elliott | 370/352 |
| 7,149,961 B2 | 12/2006 | Harville et al. | |
| 7,164,410 B2 * | 1/2007 | Kupka | 345/156 |
| 7,181,321 B2 | 2/2007 | Schlicker et al. | |
| 7,287,032 B2 | 10/2007 | Attili et al. | |
| 7,295,608 B2 * | 11/2007 | Reynolds et al. | 375/240.01 |
| 7,500,010 B2 | 3/2009 | Harrang et al. | |
| 7,536,705 B1 * | 5/2009 | Boucher et al. | 725/112 |
| 7,634,484 B2 | 12/2009 | Murata | |
| 7,664,882 B2 | 2/2010 | Mohammed et al. | |
| 7,685,204 B2 | 3/2010 | Rogers | |
| 7,769,827 B2 * | 8/2010 | Girouard et al. | 709/219 |
| 7,877,774 B1 | 1/2011 | Basso et al. | |
| 7,996,422 B2 | 8/2011 | Shahraray et al. | |
| 8,055,688 B2 * | 11/2011 | Giblin | 707/804 |
| 8,082,279 B2 | 12/2011 | Weare | |
| 8,126,936 B1 * | 2/2012 | Giblin | 707/804 |
| 8,327,270 B2 * | 12/2012 | Jones et al. | 715/733 |
| 2001/0029425 A1 | 10/2001 | Myr | |
| 2002/0013897 A1 | 1/2002 | McTernan et al. | |
| 2002/0118799 A1 * | 8/2002 | Detlef | 379/67.1 |
| 2002/0124258 A1 * | 9/2002 | Fritsch | 725/88 |
| 2002/0144262 A1 | 10/2002 | Plotnick et al. | |
| 2002/0183072 A1 * | 12/2002 | Steinbach et al. | 455/456 |
| 2003/0097571 A1 * | 5/2003 | Hamilton et al. | 713/182 |
| 2003/0108331 A1 * | 6/2003 | Plourde et al. | 386/83 |
| 2003/0110504 A1 * | 6/2003 | Plourde et al. | 725/89 |
| 2003/0110513 A1 * | 6/2003 | Plourde et al. | 725/134 |
| 2003/0114968 A1 * | 6/2003 | Sato et al. | 701/36 |
| 2003/0115150 A1 * | 6/2003 | Hamilton et al. | 705/64 |
| 2003/0115349 A1 * | 6/2003 | Brinkman et al. | 709/231 |
| 2003/0212996 A1 | 11/2003 | Wolzien | |
| 2003/0229900 A1 | 12/2003 | Reisman | |
| 2004/0003398 A1 * | 1/2004 | Donian et al. | 725/34 |
| 2004/0030798 A1 | 2/2004 | Andersson et al. | |
| 2004/0068752 A1 * | 4/2004 | Parker | 725/120 |
| 2004/0068754 A1 * | 4/2004 | Russ | 725/131 |
| 2004/0117442 A1 | 6/2004 | Thielen | |
| 2004/0198386 A1 * | 10/2004 | Dupray | 455/456.1 |
| 2004/0230655 A1 | 11/2004 | Li et al. | |
| 2005/0001940 A1 * | 1/2005 | Layne, Jr. | 348/787 |
| 2005/0022239 A1 * | 1/2005 | Meuleman | 725/46 |
| 2005/0069225 A1 | 3/2005 | Schneider et al. | |
| 2005/0080788 A1 | 4/2005 | Murata | |
| 2005/0120866 A1 * | 6/2005 | Brinkman et al. | 84/609 |
| 2005/0245241 A1 * | 11/2005 | Durand et al. | 455/414.1 |
| 2005/0249080 A1 | 11/2005 | Foote et al. | |
| 2006/0029109 A1 | 2/2006 | Moran | |
| 2006/0068822 A1 * | 3/2006 | Kalhan | 455/517 |
| 2006/0143560 A1 * | 6/2006 | Gupta et al. | 715/512 |
| 2006/0156209 A1 * | 7/2006 | Matsuura et al. | 714/798 |
| 2006/0173974 A1 | 8/2006 | Tang | |
| 2006/0174293 A1 * | 8/2006 | Ducheneaut et al. | 725/90 |
| 2006/0174311 A1 * | 8/2006 | Ducheneaut et al. | 725/135 |
| 2006/0174312 A1 * | 8/2006 | Ducheneaut et al. | 725/135 |
| 2006/0174313 A1 * | 8/2006 | Ducheneaut et al. | 725/135 |
| 2006/0230350 A1 * | 10/2006 | Baluja | 715/700 |
| 2006/0276201 A1 * | 12/2006 | Dupray | 455/456.1 |
| 2007/0067315 A1 | 3/2007 | Hegde et al. | |
| 2007/0173266 A1 * | 7/2007 | Barnes, Jr. | 455/456.1 |
| 2007/0280638 A1 * | 12/2007 | Aoki et al. | 386/95 |
| 2007/0283380 A1 * | 12/2007 | Aoki et al. | 725/32 |
| 2008/0040501 A1 | 2/2008 | Harrang et al. | |
| 2008/0060001 A1 * | 3/2008 | Logan et al. | 725/34 |
| 2008/0060084 A1 * | 3/2008 | Gappa et al. | 726/28 |
| 2008/0072272 A1 * | 3/2008 | Robertson et al. | 725/126 |
| 2008/0103689 A1 | 5/2008 | Graham et al. | |
| 2008/0184127 A1 * | 7/2008 | Rafey et al. | 715/736 |
| 2008/0195744 A1 | 8/2008 | Bowra et al. | |
| 2008/0281687 A1 * | 11/2008 | Hurwitz et al. | 705/14 |
| 2008/0301304 A1 * | 12/2008 | Chitsaz et al. | 709/228 |
| 2008/0318518 A1 * | 12/2008 | Coutinho et al. | 455/3.06 |
| 2009/0058683 A1 * | 3/2009 | Becker | 340/989 |
| 2009/0109959 A1 * | 4/2009 | Elliott et al. | 370/352 |
| 2009/0150925 A1 * | 6/2009 | Henderson | 725/34 |
| 2009/0216433 A1 * | 8/2009 | Griesmer et al. | 701/208 |
| 2011/0072466 A1 | 3/2011 | Basso et al. | |
| 2011/0296287 A1 | 12/2011 | Shahraray et al. | |
| 2012/0096490 A1 * | 4/2012 | Barnes, Jr. | 725/34 |
| 2014/0068662 A1 * | 3/2014 | Kumar | 725/34 |

OTHER PUBLICATIONS

Huicheng Chi; Qian Zhang; Juncheng Jia; Xuemin Shen—"Efficient search and scheduling in P2P-based media-on-demand streaming service"-Published in: Selected Areas in Communications, IEEE Journal on (vol. 25, Issue: 1); Jan. 15, 2007—pp. 119-130.*

Jack Brassil and Henning Schulzrinne, "Structuring Internet Media Streams with Cueing Protocols," IEEE/ACM Transactions on Networking, vol. 10, No. 4, Aug. 2002, pp. 466-476.

Diomidis D. Spinellis, "The Information Furnace: Consolidation Home Control," Pers Ubiquit Comput, (Springer-Verlag London Limited 2003), 2003, vol. 7, pp. 53-69.

* cited by examiner

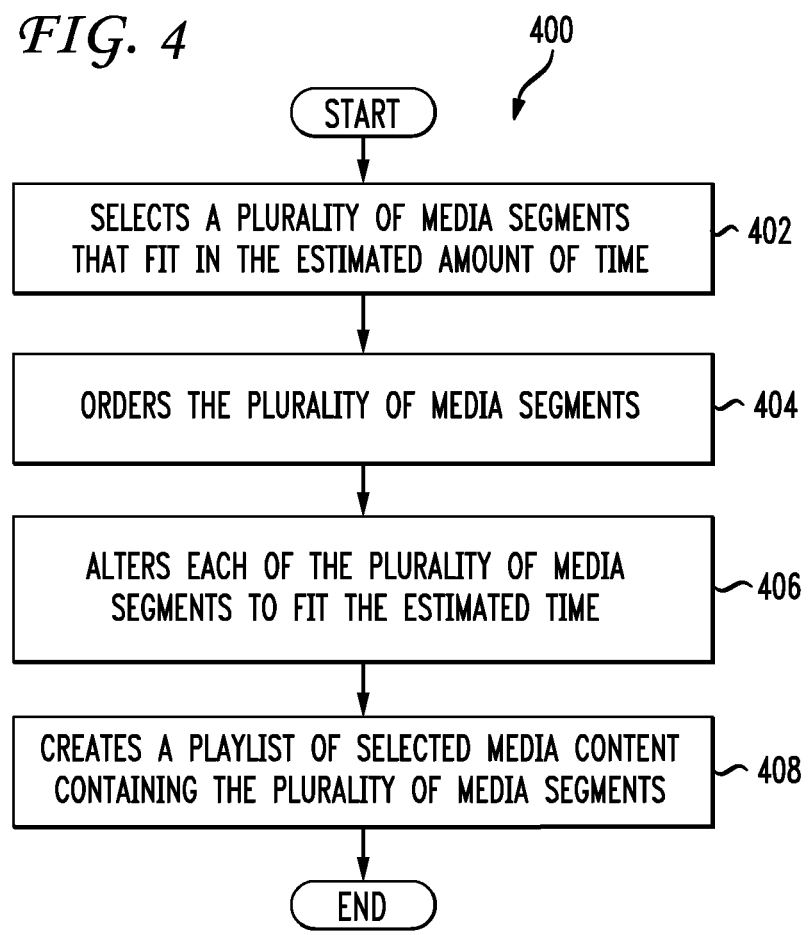

SYSTEM AND METHOD FOR ADAPTIVE PLAYBACK BASED ON DESTINATION

PRIORITY

The present application is a continuation of U.S. patent application Ser. No. 13/204,970, filed Aug. 8, 2011, which is a continuation of U.S. patent application Ser. No. 12/177,582, filed Jul. 22, 2008, now U.S. Pat. No. 7,996,422, the content of which is included herewith in its entirety.

RELATED APPLICATION

The present application is related to U.S. patent application Ser. No. 12/177,551, now U.S. Pat. No. 8,239,410, filed on the same day herewith, the contents of which are incorporated herein by reference in their entirety.

BACKGROUND OF THE INVENTION

1. Field of the Invention

The present invention relates to media playback and more specifically to adapting media playback to with content relevant to one or more anticipated destinations.

2. Introduction

Media playback has become an important part of every day life for many people. As various content delivery systems grow more and more sophisticated, media consumers may expect a certain level responsiveness, or in other words, more adaptive media. Contextual ads on the Internet can be highly targeted and relevant to the surrounding web page, making the advertisements more effective. This concept has not been applied to media playback, however. For example, users who are driving from Los Angeles to Las Vegas on I-15 may be highly susceptible to advertisements on gambling or may be interested hearing about the history of the Mojave National Preserve. There is, at present, no means of adapting media playback based on user destination.

One approach currently used in the art is to use general geographic location in an attempt to target content more effectively, such as a local business advertising on local radio or a local news station broadcasting news that would interest most of the viewers. This approach is more of a shotgun approach where a broad common interest is assumed. The media content is not tailored or customized for individual users and does not take into account their expected destinations.

Another exemplary approach in the art is prerecorded informational tours through a museum or other attraction on a portable playback device. These devices are typically linear and channel the listener along a predetermined route, ignoring the fact that users may desire to browse through the museum or attraction in a route other than the outlined route.

These and other shortcomings exist in current approaches of media playback such that there is a need in the art for a more flexible method of providing media content.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for adaptive media playback based on destination. The system of the present disclosure determines one or more destinations, collects media content that is relevant to or describes the one or more destinations, assembles the media content into a program, and outputs the program.

The systems, methods, and computer-readable media may be compatible for use with sightseeing tour media presentations, GPS-based travel guides, AM/FM radio, digital satellite radio, television broadcasts, music playback systems for callers who are on hold, or other content playback schemes.

Various embodiments include media content that is advertising, consumer-generated, based on actual or planned events, based on a user profile. The media content may be assembled to fit within an estimated available time. An adaptation engine may be used to collect media content that is relevant. Such an adaptation engine may select a plurality of media segments that fit in the estimated available time, order the plurality of media segments, and create a playlist of selected media content containing the plurality of media segments. As the expected travel path changes, destinations and the associated media content may be updated or adjusted.

Other state data may be used to alter the media content, such as data indicating that the driver is now going 60 mph, rather than 30 mph and will reach the destination sooner than originally calculated. Another embodiment bases dynamically selected media content on a user profile.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 4 illustrates an adaptation engine and method embodiment.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
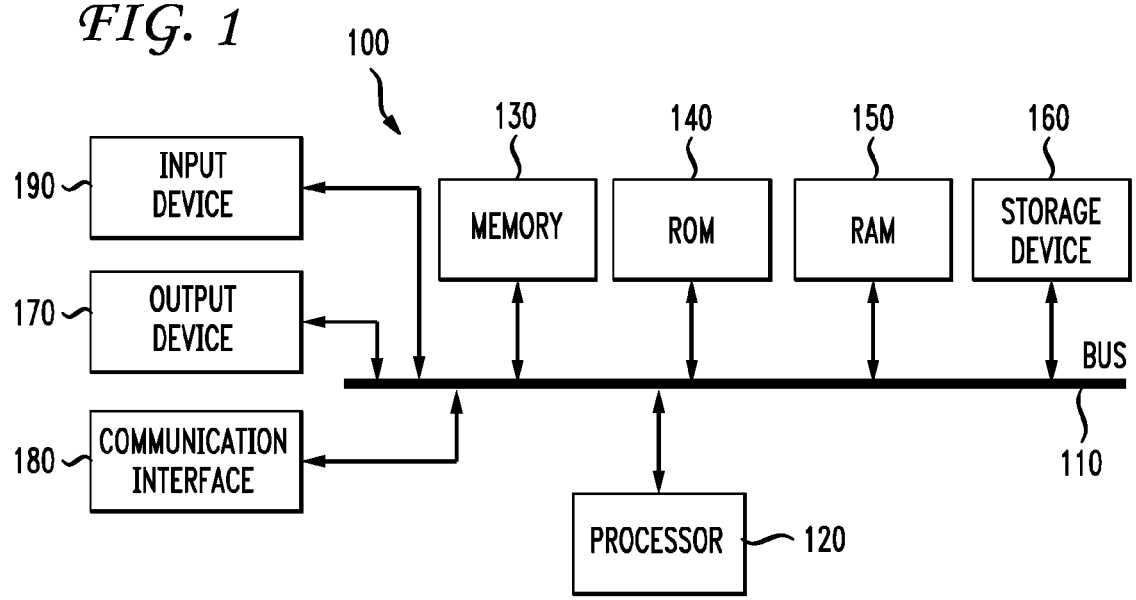
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech, global positioning system (GPS) connected with a portable navigation system for the purpose of communicating a programmed destination, and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
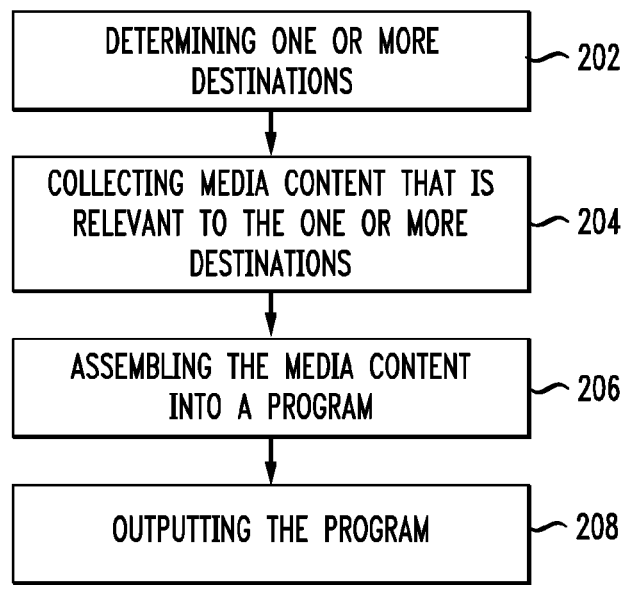
FIG. 2 illustrates a method embodiment for adaptive media playback.

FIG. 2 illustrates a method embodiment for adaptive media playback. First, the method includes determining one or more destinations (202). Examples of determining one or more destinations include highlighting scenic spots in a cross-country road trip and identifying local businesses along a commute to work. Multiple destinations may be selected based on proximity, relevance to the driver, or other factors. As a user's movement changes, the destinations are updated to reflect the new expected travel path. One example of how updated destinations occur is when a museum-goer decides to explore the museum in a non-linear order, as museum-goers are wont or when a commuter who routinely takes the same route to work every day and encounters traffic, road construction, an accident, etc. which causes the commuter to deviate from the usual commute. The expected travel path may be updated on the fly automatically or manually.

Second, the method includes assembling preliminary information about the one or more destinations. Preliminary information can be assembled from one source or from multiple sources. The preliminary information may be pre-programmed. For example, an automated sight-seeing audio tour guide or museum guide can explain about points of interest along a given route, like a series of paintings by the same artist or a particular set of monuments. In one aspect, information about points of interest is pre-prepared and stored on a local storage device for retrieval and playback. In a GPS system in a vehicle, the GPS system intersperses media content in between or over spoken directions. For example, many GPS systems give spoken signals to the user such as, "Turn left on Maple Street in 300 feet." In between those spoken signals, a Global Positioning System (GPS) unit plays back the media content based on the intended destination or planned intermediate destinations. This media content is stored locally or is retrieved via a network, wireless or wired. A user may be able to program in a destination while still in his garage, for example, and the GPS unit downloads media content through the home network for intended playback during the trip to the intended destination. A GPS unit provides media content that is audio, video, or other types of media content that are suitable for playback on the unit. Video may be interspersed with directions or simultaneous with directions, like a picture-in-picture display. Handheld GPS units can also operate in a similar fashion. One of skill in the art will understand or be able to readily discover the capabilities and limitations of GPS units and appreciate the many applications of the principles taught herein as applied to GPS units. For example, controls on the steering wheel enable a user to switch between a map on the GPS unit and media content. Other control mechanisms may be presented as well. Control mechanisms in a vehicle may be made available to the driver and to one or more passengers in the vehicle.

In one aspect, if a possible destination includes multiple sources of interest, the system engages in a dialog with the user to seek confirmation of what content to present. "Do you want content about A or B?"

Third, the method includes collecting media content that is relevant to or describes the one or more destinations (204). Media content may be advertising or a local news report that is relevant to the anticipated travel path. For example, a commuter is forewarned of a major car accident 4 miles down the freeway. Other media content may be based on actual or planned events. A calendar of events and their respective locations can serve as a repository for such media content. If a destination is a place like Gettysburg, Pa., the media content may describe events and history associated with the destination. The content may also be presented in an interactive fashion in which users may select via a touch or voice menu system various portions of the content to receive.

Often, media content based on events may serve as a type of advertising. Advertising media content may include a furniture store advertising to everyone within a half mile radius that all loveseats are 55% off until 5:00 pm. More complex advertising media content for a business like a downtown lunch restaurant may advertise coupons to individuals at lunchtime heading in the direction of the restaurant.

Decisions as to what is relevant media content may be based on a user profile. A user profile contains a database of likes and preferences representing what the user prefers to view or hear. In one aspect, a profile contains a database of dislikes representing content that should rarely or never be played. A user profile may also contain a calendar showing when, where, and what the user is planning to do so that media content is not scheduled for consumption when it would conflict with another activity. One user profile may be linked to the user's other profiles to share information. For example, the user's profile at the office and at home might be synchronized with the user's profile in his car, so the same preferences and calendar are available to each profile. A user profile may even include such items as a spending history which may give some insight into user purchasing preferences and trends, much in the same manner as Amazon.com suggests related books based on what a user has already viewed or purchased. A user profile may take in to account consumer-generated media content by other consumers who have submitted their thoughts and commentary on particular events, places, or services. Such consumer-generated media content may be contained on blogs, customer review websites, YouTube, Flickr, social networking sites such as MySpace or Facebook, or any other available resource, local or on the Internet. Consumer-generated media may be digital or otherwise, such as handwritten comments in a guest-book.

Fourth, the method includes assembling the media content into a program (206). A program may be assembled to fit within an estimated available time. If a user is driving to work every morning and the commute typically lasts 25 minutes, then portions of media content may be planned and assembled to occupy the entire 25 minutes so that they are contextually relevant to the anticipated location of the commuter when they are played.

Lastly, the method includes outputting the program (208). Program output may be audio, video, other types of sensorial output, or any combination thereof. In a guided tour aspect, output may be in the form of a small playback device with headphones attached for audio playback. While driving cross-country with the assistance of a GPS system, the program output may be video, still images, a ticker of text on the bottom of the screen, or any other visual display. Just one example of other sensorial output is Braille outputs for blind individuals to enjoy the same information. One example of a combined sensorial output is a combination of video with audio in a traditional advertising format, but other senses such as touch or smell may be incorporated. One example of a touch-based sensorial output is vibration or rumble features as are common in video games. One example of smell-based sensorial output includes the scent of freshly baked bread combined with a video clip about a local bakery.

Figure 3A:
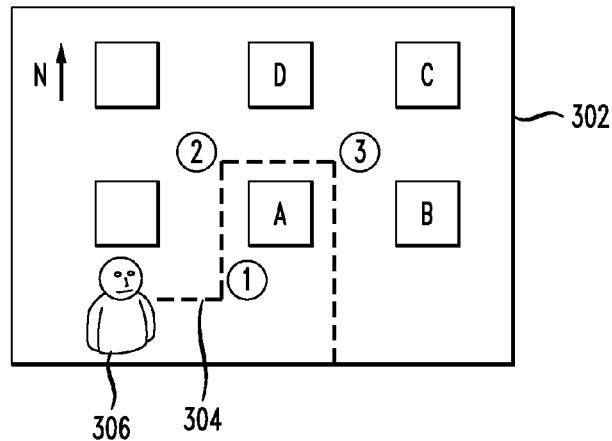
FIG. 3A illustrates adaptive media playback in a guided tour scenario.

FIG. 3A illustrates adaptive media playback in a guided tour scenario. The dotted line 304 represents the path of a walking person 306. The letters identify certain attractions in the guided tour. First, the person is walking along the dotted line east. In that direction, the destinations A and B are in the anticipated path, so media content regarding A begins to play and media content regarding B is prepared for playback after A's media content is finished and/or the person walks past A. But at point 1, the user turns north unexpectedly. Based upon this change in direction, media content about A is still playing, but based on the new trajectory, media content about D is prepared. As the user passes A and approaches D, the media content about D is played back. If content about A is still playing, it may be compressed, redacted, reduced, or otherwise cut short in anticipation of content about D. The reduction of content may be adjusted over time so the reduced time-frame content smoothly transitions and is not awkward.

At point 2, the user again changes direction east. Now C and B are both ahead, so media content about C and B are prepared and either one may be played as the user leaves D. At this point the guided tour may choose which one of C and B to play back based on the user's profile. At point 3, the user changes direction south and media content about B is played and media content about A may be retrieved again in case the user decides to revisit that particular attraction. The full version of the content for A may be output since the user has retuned to A. The user may also receive content that was previously truncated or cut short if the user returns to a destination previously visited. One possible way to accomplish this is to summarize the content previously presented and transition from the summary to a more detailed presentation of the material. Another possible way to accomplish this is providing an introduction into the content to be presented.

In a similar fashion, travelers on a freeway may be presented with media content regarding attractions or points of interest at upcoming freeway exits or rest stops. The presented media content may change based on which exits and connecting highways the travelers choose. In this way, the program may be modified, changed, or reduced as a new destination is determined.

Figure 3B:
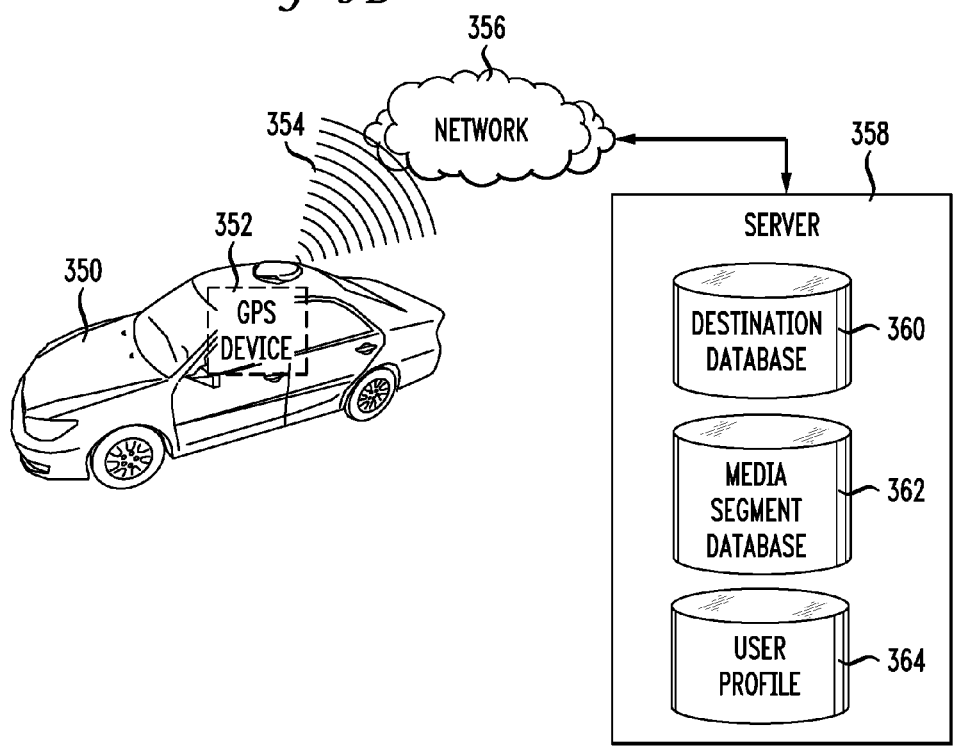
FIG. 3B illustrates an example system embodiment.

As in the freeway example given above, a vehicle may be outfitted with a GPS device which may serve as the user interface and playback device. FIG. 3B illustrates an exemplary system showing how a GPS device and other devices is used as a part of the principles described herein. A vehicle 350 may be fitted with a GPS device 352. As is known in the art, the GPS device may be affixed to the vehicle or may be removable. The GPS device may have one or more displays and may be capable of generating spoken instructions to the driver of the vehicle. The GPS may employ the speaker system in the automobile to communicate with the driver instead of internally contained speakers. The GPS unit ascertains the location, trajectory, destination and/or speed of the vehicle. Other information may also be ascertained by the GPS unit through observation or communication with satellites or by direct input from the user. The GPS unit can transmit all or part of the ascertained information over a network 356 to one or more servers 358. Transmission may be via a wireless signal 354 or other communications medium. The server can digest information received from the GPS unit and reference information from a destination database 360, a media segment database 362, and/or a user profile 364. The server may then determine one or more destination, collect media content that is relevant to one or more of the destinations, assemble media content into a program, and transmit that program to the GPS device through the network to output to the user. Of course, the principles described here apply to other mobile devices besides GPS units.

We turn now to another embodiment that relates to how the media content is collected using an adaptation engine. FIG. 4 illustrates an adaptation engine 400. The adaptation engine drives the dynamic selection and modification of media content to fill the estimated remaining amount of time with destination related content. First the adaptation engine selects a plurality of media segments that fit in the estimated amount of time 402. The plurality of media segments can be several clips that would fill the remaining time themselves, or the plurality of media segments can be several clips which, if played back to back, would fill the remaining time. Second, the adaptation engine orders the plurality of media segments 404. Potentially based on user profiles or group profiles, the plurality of media segments are organized and prioritized. In the case of audio only media, the organization is linear because only one thing may be listened to at a time. With video media, the organization of media segments may include playing several clips at once. The effect is similar to showing a stock ticker on the bottom of a news report. Third, the adaptation engine alters each of the plurality of media segments attributes to fit the estimated time 406, if necessary. The alterations may include adjusting the playback speed to extend or compress the media content to fit the estimated remaining time. Alterations may include truncating the media content. If the estimated time suddenly drops, one alteration is jumping straight to the conclusion after the current sentence ends. If the estimated time increases, one alteration is queuing up an additional media segment to follow the currently playing media segment or an alternate, longer version of previously summarized content. Fourth, the adaptation engine creates a playlist of selected media content containing the plurality of media segments 408. As stated before, the playlist may be dynamically altered or adjusted to reflect the current estimated time remaining while retaining the destination relevance. FIG. 4 also illustrates a corresponding method embodiment as well.

In the case of a vehicular implementation, a GPS unit, such as a Garmin™, displays the media content on the entire screen or a subsection thereof. A handheld GPS unit may also display media content in a non-vehicular implementation. In vehicular or other implementations, media content may also be displayed or played back on a portable DVD player, a DVD player integrated into a vehicle, an Apple iPod™ or other portable media player, a Bluetooth headset, a RIM Blackberry™, or any other device capable of playing media content. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium.

Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in self-guided tours (vehicular or ambulatory), museums, schools, zoos, or in GPS-assisted trip planning systems. Devices may be operative in any kind of network, such as the IP Multimedia Subsystem, wireless network, etc. Those skilled in the art will readily recognize various modifications and changes that may be made to the present invention without following the example embodiments and applications illustrated and described herein, and without departing from the true spirit and scope of the present invention.

We claim:
1. A method comprising:
   determining a current location associated with a device;
   determining a destination, where the destination is an expected future location of the device;
   collecting, via a processor, media content comprising audio content and video content, the media content based on one of an actual event, a planned event, the current location, the destination, and a path from the current location to the destination, wherein the media content is a media segment comprising one of advertising, consumer generated media, and media based on a user profile;

generating a media presentation from the media content based on an estimated available time to get to the destination, wherein the media content is altered to fill the estimated available time;

playing the media presentation interspersed with directions to the destination;

upon detecting, while playing the media presentation, an available time change associated with the estimated available time, generating an updated available time;

altering the media segment to allow the media presentation to fit within one of the estimated available time and the updated available time; and modifying the media presentation to conform to the updated available time while playing the media presentation.

2. The method of claim 1, wherein the estimated available time is determined based on one of an input, a route, a speed, and a trajectory between the current location and the destination.

3. The method of claim 1, further comprising communicating the media presentation to a user via the device.

4. The method of claim 1, wherein the media presentation is presented using one of video, Internet content, text, sound files, odor, and Braille.

5. The method of claim 1, wherein the current location is determined by a global positioning system device.

6. A system, comprising:

a processor; and a computer-readable storage medium having instructions stored which, when executed by the processor, cause the processor to perform operations comprising:

determining a current location associated with a device;

determining a destination, where the destination is an expected future location of the device;

collecting, via a processor, media content comprising audio content and video content, the media content based on one of an actual event, a planned event, the current location, the destination, and a path from the current location to the destination, wherein the media content is a media segment comprising one of advertising, consumer generated media, and media based on a user profile;

generating a media presentation from the media content based on an estimated available time to get to the destination, wherein the media content is altered to fill the estimated available time playing the media presentation interspersed with directions to the destination;

upon detecting, while playing the media presentation, an available time change associated with the estimated available time, generating an updated available time;

altering the media segment to allow the media presentation to fit within one of the estimated available time and the updated available time; and modifying the media presentation to conform to the updated available time while playing the media presentation.

7. The system of claim 6, wherein the estimated available time is determined based on one of an input, a route, a speed, and a trajectory between the current location and the destination.

8. The system of claim 6, the computer-readable storage medium having additional instructions stored which result in operations comprising communicating the media presentation to a user via the device.

9. The system of claim 6, wherein the media presentation is presented using one of video, Internet content, text, sound files, odor, and Braille.

10. The system of claim 6, wherein the current location is determined by a global positioning system device.

11. A computer-readable storage device having instructions stored which, when executed by a computing device, cause the computing device to perform operations comprising:

determining a current location associated with a device;

determining a destination, where the destination is an expected future location of the device;

collecting, via a processor, media content comprising audio content and video content, the media content based on the current location, the destination, a path from the current location to the destination, wherein the media content is a media segment comprising one of advertising, consumer generated media, and media based on a user profile;

generating a media presentation from the media content based on an estimated available time to get to the destination, wherein the media content is altered to fill the estimated available time playing the media presentation interspersed with directions to the destination;

upon detecting, while playing the media presentation, an available time change associated with the estimated available time, generating an updated available time;

altering the media segment to allow the media presentation to fit within one of the estimated available time and the updated available time; and modifying the media presentation to conform to the updated available time while playing the media presentation.

12. The computer-readable storage device of claim 11, wherein the estimated available time is determined based on one of an input, a route, a speed, and a trajectory between the current location and the destination.

13. The computer-readable storage device of claim 11, the computer-readable storage device having additional instructions stored which result in operations comprising communicating the media presentation to a user, via the device.

14. The computer-readable storage device of claim 11, wherein the media presentation is presented using one of video, Internet content, text, sound files, odor, and Braille.

* * * * *